US005641919A

United States Patent [19]

Dahneke

[11] Patent Number: 5,641,919

[45] Date of Patent: Jun. 24, 1997

[54] METHOD OF CHARACTERIZING PARTICLES BY MULTIPLE TIME-OF-FLIGHT MEASUREMENTS

[76] Inventor: Barton E. Dahneke, 930 Johnson Rd., Palmyra, N.Y. 14522

[21] Appl. No.: 897,877

[22] Filed: Jun. 12, 1992

[51] Int. Cl.$^6$ .................................................. G01N 21/00

[52] U.S. Cl. ........................ 73/865.5; 73/28.01; 250/287; 250/288; 356/336; 356/337

[58] Field of Search ................................ 73/28.01, 24.03, 73/24.01, 19.03, 865.5; 250/287, 282, 288; 356/335, 336, 337

[56] References Cited

U.S. PATENT DOCUMENTS

| | | | |
|---|---|---|---|
| 3,410,142 | 11/1968 | Daiber et al. | 73/24.01 |
| 3,854,321 | 12/1974 | Dahneke | 73/865.5 |
| 4,358,302 | 11/1982 | Dahneke | 250/288 |
| 4,420,720 | 12/1983 | Newton et al. | 324/71.4 |
| 4,706,509 | 11/1987 | Riebel | 73/24.03 |
| 4,818,862 | 4/1989 | Conzemius | 250/287 |
| 4,917,494 | 4/1990 | Poole et al. | 356/335 |
| 5,128,543 | 7/1992 | Reed et al. | 250/287 |
| 5,160,840 | 11/1992 | Vestal | 250/287 |

FOREIGN PATENT DOCUMENTS

| | | | |
|---|---|---|---|
| 0044596 | 1/1982 | European Pat. Off. | 73/24.03 |

*Primary Examiner*—Laura Edwards
*Attorney, Agent, or Firm*—Harold E. Cole

[57] ABSTRACT

The method of measuring at least two distinct properties of a single particle comprising: a) accelerating a particle having a certain velocity in at least one acceleration region, the acceleration region being a region in which the velocity of the particle changes, to cause the velocity of the particle to vary; b) detecting a passage of the particle at each of three or more locations within or near an acceleration region; c) measuring a set of time-of-flight values for the particle, each time-of-flight value being equal to a time interval between the passage of the particle at two locations; and d) determining the values of at least two properties of the particle by comparing the set of time-of-flight values for the particle with calibration data.

20 Claims, 3 Drawing Sheets

METHOD OF CHARACTERIZING PARTICLES BY MULTIPLE TIME-OF-FLIGHT MEASUREMENTS

TECHNICAL FIELD OF THE INVENTION

The present invention is directed to methods for determining two or more property values of a particle such as size, mass, electrostatic charge or shape.

BACKGROUND OF THE INVENTION

Measurement of atoms, fragments of molecules, molecules, droplets and particles (simply denoted particles hereafter) by measurement of a single time-of-flight (TOF) value is a convenient method utilized in TOF mass spectroscopy analysis of atomic and molecular species and in the characterization of particles suspended in a gas by various particle TOF spectrometer devices. See, for example, U.S. Pat. No. 4,917,494. There is a problem with such devices in that only a single TOF value is measured and utilized to provide information about the character of the particle. When a TOF value depends on two or more particle properties, the TOF provides a single property of the particle when all other particle properties that influence the TOF are known. When two or more such properties are not known, a single measured TOF cannot generally be used to accurately determine another particle property besides the TOF without substantial uncertainty. For example, size can be precisely determined in an aerodynamic device when values of TOF and other particle properties, such as mass density and shape, are known. Likewise, a mass species is distinguished from another mass species having the same charge to mass ratio or associated with the same mass species having a different charge to mass ratio by use of a TOF value obtained from a TOF mass spectrometer device only when at least one other property value of the particle is known.

Because of the limited information provided by currently used single TOF methods and devices for characterizing particles, improved methods are desired.

It is an object of this invention to provide an improved method for characterizing particles by determining various property values.

It is another object of this invention to provide an aerodynamic method for characterizing particles.

It is a further object of this invention to provide a rapid method for determining at least two property values for one or more particles.

It is still another object of this invention to detect the passage of at least one particle at each of at least three detection locations while the particle is acted on by forces dependent on the property values of the particle(s) and to use the time differences between the passages of the particle(s) past the detection locations to determine at least two property values of the particle(s).

It is still yet another object of this invention to process signals from the detector(s) so as to obtain the correct set of TOF values for each particle which passes through the set of detection locations.

It is still another object of this invention to provide a method for determination of a size, mass, shape factor or electric charge property value of a particle.

It is still a further object of this invention to provide a method for determination of the amount of material dissolved and/or suspended in a gas or liquid by determination of the mass, mass fraction, mass concentration, volume, volume fraction or volume concentration of the dissolved or suspended material in the gas or liquid.

SUMMARY OF THE INVENTION

These and other objects are achieved in accordance with this invention which comprises a method of measuring at least two properties of a particle comprising:

a) accelerating the particle in at least one acceleration region to cause the velocity of the particle to vary in accordance with its location and property values;

b) detecting the passages of the particle at three or more locations within or near the acceleration region using one or more detectors;

c) measuring a set of time-of-flight values for the particle, the time-of-flight values being equal to the time intervals between the passages of the particle between pairs of the locations; and d) determining the values of the properties of the particle by comparing the set of time-of-flight values for the particle with calibration data.

This method of measuring at least two particle properties can utilize acceleration of the particle in an acceleration region caused by a drag force acting on the particle in a suspending fluid and/or by an imposed electromagnetic field. Moreover, this method can be used with the suspending fluid being a gas and with one of the two properties being the size, mass, electric charge or shape factor, such as an aerodynamic or hydrodynamic shape factor. To obtain the size property of the particle, the comparison of the set of TOF values to the calibration data can be used to determine the aerodynamic diameter, the equivalent volume sphere diameter, the equivalent envelope volume sphere diameter or the equivalent set of one or more TOF values sphere diameter. The mass property of the particle can be determined by determining a) the equivalent volume sphere diameter and the mass density properties of the particle or b) the equivalent envelope volume sphere diameter and the effective mass density properties of the particle or c) the equivalent drag sphere diameter and the shape factor and the mass properties of the particle. Or, the property values can be determined for the particle to correspond to an aerodynamically or hydrodynamically equivalent particle having an equivalent set of at least two TOF values.

The method of the present invention operates upon an acoustic or electromagnetic time-marker-signal generated at the passage of the particle past each of the detection locations. At least one detector is used for detecting all of the passages of the particle past the detection locations. The detector(s) are positioned and oriented to detect the passage of at least one particle illuminated by an acoustic or electromagnetic field at each of a set of three or more detection locations.

At least one of the time-marker-signals can be generated by detection of scattered light from illumination of the particle in the region of at least one of the detection locations using at least one light sensitive detector.

The signals from the detector(s) are monitored to determine the precise moment of passage of a particle past each detection location and a set of n TOF values for each particle between the set of n+1 detection locations is determined, where n=2, 3, 4, 5, 6, 7, . . . .

The information contained in the measured set of n TOF values reveals the particle motion in response to the aerodynamic and/or other forces that cause its movement past the detection locations. Since the particle motion depends on the values of at least two particle properties, the measured set of TOF values is used with calculated and measured calibration data to determine values of at least two properties of the particle from the set of properties that includes the size, mass, shape factor and electrical charge properties of the particle or their equivalents. Calculated calibration data relating sets of TOF values and particle property values is provided by solutions of the particle equation of motion in the specified acceleration field with specified forces acting on the particle for specified sets of particle property values. Measured calibration data relating sets of TOF values and particle property values is provided by measured sets of TOF values for particles of known property values.

The set of TOF values for a particle can be determined by measurement or computation of the multi-dimensional correlation function, or a function derived therefrom, of the signals from the detector(s) generated at the passages of the particle past the detection locations. In particular, the multi-dimensional correlation function, or a function derived therefrom, of the time-marker-signals can be measured or computed. The multi-dimensional correlation function can be a double correlation function of the time-marker-signals generated at the passage of the particle past three detection locations or a triple correlation function of the time-marker-signals generated at the passage of the particle past four detection locations. Multi-dimensional correlation processing methods or their equivalents are used in the invention as a means by which the set of time differences of rapidly occurring signals due to passage of one or more particles past the set of n+1 detection locations, i.e., the set of n TOF values of one or more particles, is computed and recorded in such a way that each of the n TOF values of the set is properly associated with the other n−1 TOF values of that same set even when many sets of TOF values due to many particle passages are rapidly measured, computed and recorded.

DETAILED DESCRIPTION OF THE DRAWINGS

Figure 1:
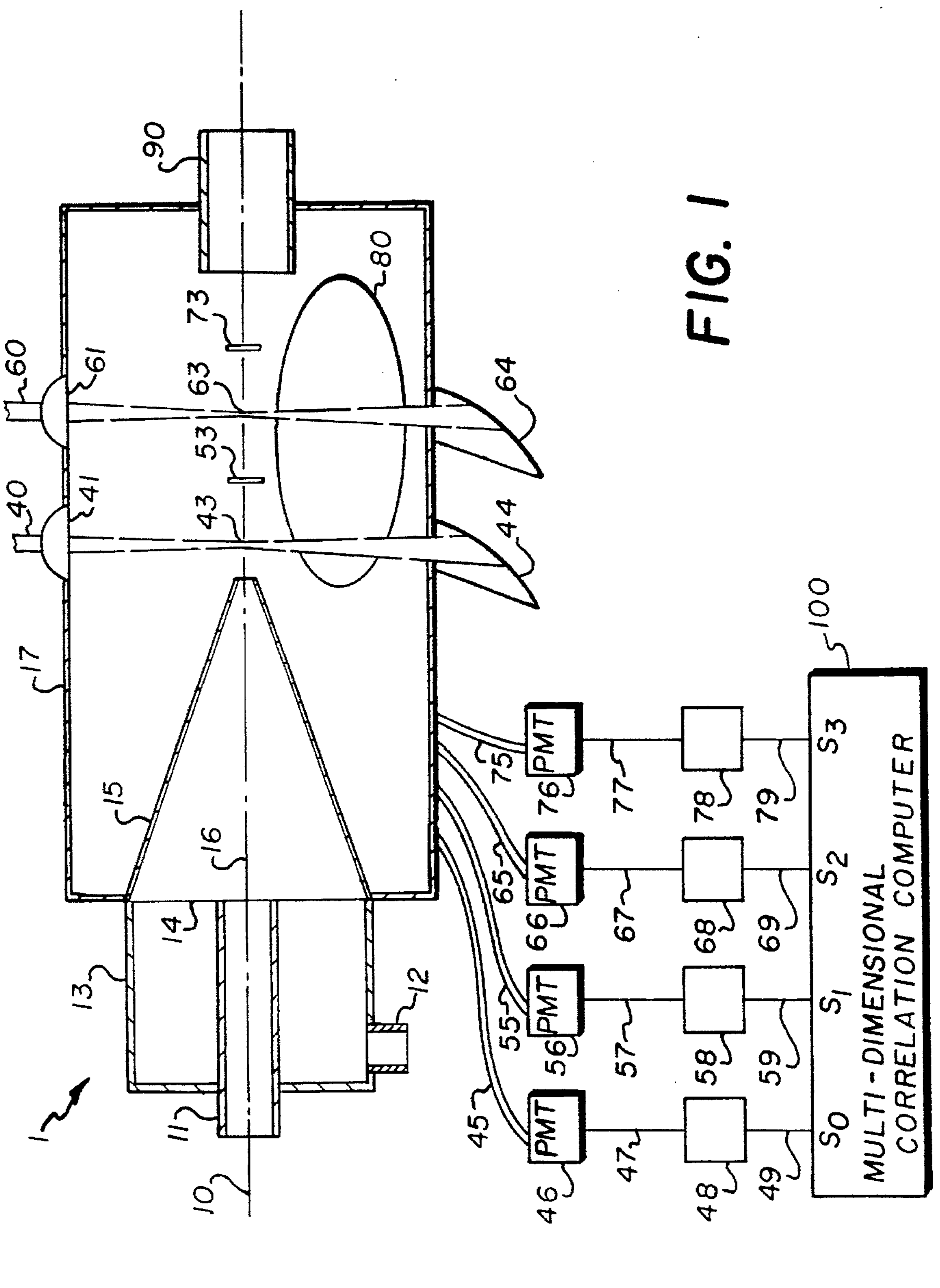
FIG. 1 is a block diagram of an aerodynamic multiple TOF spectrometer device and associated signal processing equipment. In this device, particles are accelerated in an expanding gas jet and illuminated by focused laser light beams as they pass detection locations at specified separations from the exit plane of a nozzle.

Illustrated in FIG. 1 is a Particle TOF Spectrometer device 1 which is used to measure the set of TOF values of at least one particle. This set can be used to determine at least two of the size, mass, shape factor, charge or other properties of the particle. A sample flow of air or other gas containing at least one suspended particle 10, is introduced from a source, not shown, through inlet duct 11 into nozzle 15 having the shape of a converging conical section. The air or other gas is caused to flow through inlet duct 11 by a pressure drop maintained by means not shown so that neither the flow nor the gas properties vary substantially during measurement of the set of TOF values of the particle 10. Co-axial with inlet duct 11 is a second duct 13 into which a clean gas sheath flow is introduced through inlet 12 by means not shown. Clean gas sheath flow is introduced into nozzle 15 through laminating screen 14 in such a way that the sheath flow surrounds the sample flow causing particle 10 to be located near centerline 16 of nozzle 15.

Upon flowing through nozzle 15, the gas and suspended particle 10 enter chamber 17. The pressure of gas in chamber 17 is controlled by use of pumping means, not shown, connected to exhaust duct 90.

In one preferred embodiment, the pressure in chamber 17 is maintained near or below 0.01 times the pressure in inlet duct 12 so that a shock-free zone of supersonic gas flow extends from the exit plane of nozzle 15 to the entrance plane of exhaust duct 90, where an attached shock occurs. In this preferred embodiment, the flow through nozzle 15 is auto-regulated by choking of the flow near the nozzle exit, where the gas obtains sonic velocity, and the gas flow forms a supersonic free-jet near axis 16 in chamber 17 free of shock wave disturbances between nozzle 15 and exhaust duct 90. Within this supersonic free-jet, the gas properties are known as a function of position in the jet and of the gas properties at the stagnation condition, i.e., in inlet duct 11.

Alternatively, in another preferred embodiment, the gas pressure in chamber 17 is maintained by means, not shown, at a pressure only slightly reduced below the gas pressure in inlet duct 11. In this embodiment, the flow near axis 16 in nozzle 15 and chamber 17 is exclusively sub-sonic so that a sub-sonic free-jet is formed near axis 16 in chamber 17. Within this sub-sonic free-jet, the gas properties are known as a function of position in the jet and of the gas properties at the stagnation state.

Within chamber 17, laser light beams 40 and 60 generated by means, not shown, are transmitted into chamber 17 through cylindrical lens windows 41 and 61 so that thin sheets of illumination 43 and 63 perpendicular to axis 16 are formed over regions near axis 16. Upon passing through chamber 17, laser beams 40 and 60 are substantially absorbed in light traps 44 and 64. Two additional laser beams generated by means, not shown, are also transmitted into chamber 17 through two additional cylindrical lens windows, not shown, causing thin sheets of illumination 53 and 73 perpendicular to axis 16 to be formed over regions near axis 16. Upon passing through chamber 17 said two additional laser beams are substantially absorbed in additional light trap means, not shown.

As particle 10 is carried by the gas flow through thin sheet of illumination 43, a portion of the incident illumination is scattered into collector lens 80 by particle 10. The scattered light signal from particle 10 in illumination sheet 43 is collected by lens 80 and focused onto the face of a thin optical fiber 45 not shown behind chamber 17 and located by means not shown at the image point of lens 80 of the intersection of thin sheet of illumination 43 and axis 16. Only light originating near this intersection point (the zero object point of lens 80) is focused onto the face of optical fiber 45, because of the small cross-section of the fiber. Background light signals are launched into optical fiber 45 with very poor efficiency providing good optical noise rejection.

The scattered light signal from particle 10 collected by lens 80 and launched into optical fiber 45 is transmitted by optical fiber 45 to photo-multiplier tube (PMT) detector 46, which converts the scattered light signal into a negative electrical current pulse. The negative current pulse is conducted by coaxially shielded signal cable 47 to time-marker-pulse generator or electronic signal conditioner 48, which converts the negative current pulse from PMT detector 46 by means, not shown, into a positive transistor-transistor-logic (TTL) compatible voltage pulse having fixed width and amplitude irrespective of the size, shape, velocity and other properties of particle 10. The positive voltage pulse output signal of electronic signal conditioner 48 is a narrow, shaped, voltage pulse that occurs at the time of passage of any particle 10 past a detection location within sheet of illumination 43.

The axial detection location which corresponds to an axial location within thin sheet of illumination 43 is denoted the zero detection location and the output signal of the electronic signal conditioner 48 is denoted signal $S_0$. Output signal $S_0$ thus consists of at least one discrete, narrow, shaped, TTL-compatible, voltage pulse which marks the time of passage of at least one particle 10 past the zero detection location. Such a pulse is thus called a time-marker-pulse of signal $S_0$ because it marks the time of passage of a particle 10 past the zero detection location within thin illumination sheet 43. Signal $S_0$ is conducted via coaxially shielded cable 49 to the $S_0$ input of multi-dimensional correlation computer 100.

The scattered light signals generated when particle 10 passes through thin sheets of illumination 53, 63 and 73 near axis 16 (the first, second and third object points of lens 80) are also collected by lens 80 and focused onto the faces of optical fibers 55, 65 and 75, respectively, since the faces of said fibers not shown behind chamber 17 are positioned at the first, second and third image point locations of lens 80 by means not shown. Said scattered light signals so launched into optical fibers 55, 65 and 75 are transmitted to and detected by PMTs 56, 66 and 76 which generate negative current pulses in co-axially shielded cables 57, 67 and 77, respectively. Said negative current pulses are converted by means, not shown, to discrete, narrow, positive, shaped, TTL-compatible, voltage pulses at the times of passage of particle 10 past detection locations one, two and three by time-marker-pulse generators or signal conditioners 58, 68 and 78, the output signals of which are denoted output signals $S_1$, $S_2$ and $S_3$, respectively.

Output signals $S_1$, $S_2$ and $S_3$ thus each consist of at least one discrete, narrow, shaped, TTL-compatible, voltage pulse which marks the time of passage of at least one particle 10 past detection location one, two or three within thin sheet of illumination 53, 63 or 73, respectively. These pulses are called the time-marker-pulses of signals $S_1$, $S_2$ and $S_3$ because they mark the time of passage of a particle 10 past detection locations one, two or three within thin illumination sheets 53, 63 or 73. Signals $S_1$, $S_2$ and $S_3$ are conducted via coaxially shielded cables 59, 69 and 79 to the $S_1$, $S_2$ and $S_3$ inputs of multi-dimensional correlation computer 100.

As a particle 10 passes through device 1, one time-marker-pulse occurs on each of the four signal lines $S_0$, $S_1$, $S_2$ and $S_3$. The time intervals between the first of these pulses and each of the later ones, or their equivalents, comprise the set of TOF values for the particle by means of which it is characterized. These time intervals are measured and recorded by use of any of a number of preferred methods.

One preferred method is the use of a multi-dimensional correlation computer 100 or its equivalent which computes the n-dimensional correlation function $$C_n(\tau_1, \tau_2, \ldots, \tau_n) = \langle S_0(t) \cdot S_1(t+\tau_1) \cdot S_2(t+\tau_2) \cdot \ldots \cdot S_n(t+\tau_n) \rangle \quad [1]$$

where $\tau_1, \tau_2, \ldots, \tau_n$ is the set or vector of n TOF values for a particle which set is represented hereinafter simply by the vector $\tau(=\tau_1, \tau_2, \ldots, \tau_n)$ for brevity, amplitude $C_n(\tau)$ is proportional to the probability density of the number of observations of the set $\tau$, $S_0(t)$, $S_1(t)$, . . . , $S_n(t)$ are n+1 signals containing time-marker-pulses denoting the passage of a particle past detection locations 0,1,2, . . . , n, n=1, 2, 3, 4, . . . , t is the time variable, and the angular brackets < > denote that the quantity contained therein is averaged over the time t.

In the case of device 1, n=3 and signals $S_0$, $S_1$, $S_2$ and $S_3$ and multi-dimensional correlation computer 100 are utilized to compute a double correlation function $C_2(\tau)$ or a triple correlation function $C_3(\tau)$. However, the method is not limited to four input signals. Fewer or more can also be utilized with fewer or more detection locations and associated optical and electronic components.

In another preferred embodiment, other signal processing means utilize the time-marker-pulses to accumulate a polyspectral analysis $F_n(\omega)$ of the signals $S_0(t)$, $S_1(t)$, . . . , $S_n(t)$ such as a power spectral analysis over frequencies $\omega(=\omega_2, \ldots, \omega_n)$. The resulting function $F_n(\omega)$contains equivalent information to $C_n(\tau)$ and, indeed, one can be derived from the other. The two functions $C_n(\tau)$ and $F_n(\omega)$ are thus regarded as equivalent. Although the embodiments described in detail herein utilize $C_n(\tau)$, it is to be understood that polyspectral analysis $F_n(\omega)$ is equivalent and therefore included.

In the preferred embodiment, multi-dimensional correlation computer 100 operates in a digital, single-bit-clipped mode so that at the passage of a particle 10 through the detection locations, a single count is added to the correct $\tau=\tau_1, \tau_2, \ldots, \tau_n$ element of the array of values being $C_n(\tau)$. The correct $\tau$ element of $C_n(\tau)$ is the element for which the first TOF is between $\tau_1$ and $\tau_1+\Delta\tau_1$, the second TOF is between $\tau_2$ and $\tau_2+\Delta\tau_2$, . . . and the nth TOF is between $\tau_n$ and $\tau_n+\Delta\tau_n$, where $\Delta\tau_1, \Delta\tau_2, \ldots, \Delta\tau_n$ are the selected sample time values for TOF dimensions 1, 2, . . . , n, respectively. When $\Delta\tau_1=\Delta\tau_2=\ldots=\Delta\tau_n=\Delta\tau$, the sample time value is equal to $\Delta\tau$ for all TOF dimensions. After removal by analysis methods not described of false counts in $C_n(\tau)$, i.e., removal of the count at each TOF set containing at least one artifactual TOF value caused by at least one uncorrelated time-marker-pulse originating from one or more noise pulses or from one or more particles different from that for which other TOF values of the set are determined, $C_n(\tau)$ is equal to the number of particles observed having first TOF between $\tau_1$ and $\tau_1+\Delta\tau_1$, second TOF between $\tau_2$ and $\tau_2+\Delta\tau_2$, and so on. This array of values being $C_n(\tau)$ and arrays of values from which $C_n(\tau)$ can be derived are denoted the multi-dimensional correlation function of dimension n=1, 2, 3, 4, . . . . Any apparatus by means of which $C_n(\tau)$ is measured or computed is denoted herein multi-dimensional correlation computer and shown as 100 in devices 1 and 2.

For each particle 10 that passes through apparatus 1 and is sensed at each detection location thus generating 4 time-marker-signal pulses, a single count is added to the triple correlation function $C_3(\tau)$ at the correct TOF set $\tau(=\tau_1, \tau_2, \tau_3)$. Thus, the triple correlation function $C_3(\tau)$ provides directly the distribution of counts or particles measured over three-dimensional TOF-set space $\tau=\tau_1, \tau_2, \tau_3$.

Moreover, because of the nature of the signal processing utilized in computing $C_n(\tau)$, multiple particles can arrive at high rates and even simultaneously at all but one detection location and still be properly characterized. The function $C_n(\tau)$ provides a single particle count for each correct set of time-marker-pulses, provided noise in $C_n(\tau)$ due to uncorrelated and partially correlated sets of time-marker-pulses is properly eliminated from $C_n(\tau)$ by additional analysis methods. Thus, use of the multi-dimensional correlation computer 100 in device 1 allows the TOF-set of a single particle 10 to be measured or the TOF-sets of many particles to be rapidly measured at rates that range up to tens of thousands per second. The set of TOF values $\tau=\tau_1, \tau_2, \tau_3$ is obtained within the appropriate sample time tolerances for each particle measured or the probability density of particles over the $\tau_1, \tau_2, \tau_3$ variable space is obtained.

For each set of $\tau_1, \tau_2, \tau_3$ TOF values at which one or more particles is measured, two or more of the mass m, size D, shape factor $\kappa_0$ values or other properties are determined. The calibration database from which this set of property values determined from the measured TOF-set is comprised of both calculated and measured calibration data. In either case, the theory of particle motion in device 1 and in other similar devices is used to provide both calculated results or an understanding of how to use measured results. For this purpose, the theory of particle motion in device 1 and in similar devices will now be described in some detail along with example results.

Throughout the motion of particle 10 along a trajectory near axis 16, the axial component of the motion is caused by the axial forces acting on the particle according to $$m\cdot dV/dt=m\cdot V\cdot dV/dx=f\cdot(U-V)+m\cdot g+\alpha\cdot q\cdot E \quad [2]$$

where m is the particle mass, V the local axial particle velocity component, t the time, x the axial displacement, f the local friction coefficient of the particle, U the local axial gas velocity component, g the axial component of the gravitational or other body-force potential field constant, $\alpha$ the proportionality constant 1.6802e—12 dynes/(proton charge)/(V/cm), q the particle charge in number of proton charges and E the axial field strength in volts/centimeter (V/cm). In some cases, other electromagnetic forces are also included in [2]. These other forces are not included here for simplicity, but they are utilized in embodiments of the present invention.

Before describing solutions of equation [2] and their use with apparatus 1 in the characterization of particles, definitions of some of the quantities by which particles are characterized are needed as well as descriptions of how parameters such as m and f in [2] are defined in terms of these quantities.

The particle mass can be determined from the particle material volume $$m=\pi/6\cdot\rho_0\sigma D_{ve}^3 \quad [3]$$

where the reference mass density $\rho_0=1$ gm/cm$^3$, $\sigma$ is the specific gravity of the particle material and $D_{ve}$ is the volume equivalent sphere diameter, i.e., the diameter $D_{ve}$ of a sphere having the same volume $\pi/6\cdot D_{ve}^3$ as the particle material.

The particle mass can also be determined from the envelope volume of the particle material $$m=\pi/6\cdot\rho_0\sigma_a\cdot D_{eve}^3 \quad [4]$$

where the reference density $\rho_0=1$ gm/cm$^3$ as before, $\sigma_a$ is the apparent specific gravity of the particle material and $D_{eve}$ is the envelope volume equivalent sphere diameter, i.e., the diameter of a sphere having the same volume as the envelope containing the particle material and pores, voids, cracks and fissures in the particle material whether they be open to the ambient fluid or closed or whether they be filled with another material or empty.

Clearly, a particle containing closed pores will experience an aerodynamic force that depends only on its outer surface geometry and material properties. Likewise, a particle containing open cracks or fissures which are sufficiently narrow so that fluid cannot readily flow through or within them will experience an aerodynamic force that depends only on its outer surface envelope geometry and material properties.

At some size scale of open pores, cracks and fissures, the openings are sufficiently large so that fluid flow significantly penetrates the particle envelope. The detailed particle surface morphology must then be considered in determining the aerodynamic force on the particle. Complexities associated with such detailed considerations are avoided here simply by noting that either of the diameters $D_{ve}$ or $D_{eve}$ and/or the particle mass m and/or the particle specific gravity $\sigma$ or apparent specific gravity $\sigma_a$ or their equivalents are used to characterize a particle.

At least two additional particle diameters are used in the characterization of particles. Both of these diameters are derived from the drag force acting on a particle, directly or indirectly. The first of these is the particle aerodynamic diameter $D_{ae}$ defined as the diameter of a sphere of mass density 1.0 gm/cm$^3$ having settling velocity equal to that of the particle. The second is the equal TOF sphere diameter $D_{tof}$ of a particle defined as the diameter of a sphere of specified or unspecified mass density having at least one TOF value equal to at least one measured TOF value of the particle. Thus, any of the diameters $D_{ae}$, $D_{tof}$, $D_{ve}$ or $D_{eve}$ can be used to characterize the particle size. The general variable D is used herein to represent any one of them or other particle size measure. Characterization of a particle by its mass m and size D is equivalent to characterizing it by a suitable diameter and mass density $\rho=\rho_0\sigma$ or specific gravity $\sigma$ or apparent specific gravity $\sigma_a$.

For small particles in a fluid moving at relatively low velocities, the particle Reynolds number $Re=D\cdot|U-V|/\upsilon$ is order 0.1 or less, with D a characteristic particle size and $\upsilon$ the kinematic viscosity of the suspending fluid. The sedimentation velocity of the particle $V_s$, equals mg/f so that for uncharged particles or particles in zero field strength, the solution of [2] depends only on the particle aerodynamic diameter $D_{ae}$. That is, for small particles in relatively slow flows, only $D_{ae}$ needs to be determined to determine the sedimentation velocity of the particle. However, under such conditions and in the absence of an electric field, only $D_{ae}$ can be determined from measurements of particle motion.

When an electric field is present, measurement of two TOF values together with solutions of [2]provides $D_{ae}$ from determination of f/m and q/m.

For larger particles and/or for suspending fluids moving at larger accelerations (positive or negative) such that the magnitude of the fluid/particle velocity difference |U−V| becomes sufficiently large that Re moderately exceeds order unity, a set of TOF values reveals additional information about the particle property values. For example, measurement of one TOF value for motion over a path whereupon the |U−V| range is low and a second TOF value over a path whereupon the |U−V| a range includes moderately high values allows inference via solutions of [2] of $D_{ve}$, $\sigma/\kappa_0$ and q/m or their equivalents, where $\kappa_0$ is the dynamic shape factor. Such an inference is possible because at low to moderate velocities $$f\approx 3\pi\eta\kappa D_{ve}/C_s(D_{ve})$$

where, to adequate approximation, $\kappa=\kappa_0\ (1+a_1\cdot Re^{b}1)$ with $\kappa_0$, $a_1$ and $b_1$ being constants and with $\kappa_0$ being particle shape dependent. For example, for Re ≦6, $a_1=0.13$, $b_1=0.85$ and $\kappa_0=1{,}000$ for a sphere, 1.182 for a tetrahedron and 1.065 for an octahedron. Substitution of these expressions for f and $\kappa$ into [2] gives $$V \cdot dV/dx = (18\eta\kappa)/(C_s\rho_0\delta D_{ve}^2) \cdot (U-V) + g + \alpha E \cdot q/m. \quad [5]$$

It follows that the particle motion depends only on particle properties $D_{ve}$, $\delta/\kappa_0$ and q/m. That is, any or all of these quantities but only these quantities or their equivalents can be determined from a set of three or more TOF values for a particle which obtains only low to moderate values of Re.

Although specific gravity and shape information are not separately available in this last case, such information may be obtained in some instances. For example, when many sample particles have the same mass density but varying shape, the range of $D_{ve}$ and $\delta/\kappa$ combinations will include some particles which have nearly spherical shape and others which have increasingly non-spherical shape. Since any deviation from spherical shape causes an increase in $\kappa_0$ (for particles aligned with their longest axis in a fixed direction), the maximum $\delta/\kappa_0$ values obtained at each $D_{ve}$ value will correspond to particles of spherical or nearly spherical shape for which $\kappa_0=1.00$. For these particles, the value of $\delta$ is determined from the values of $\delta/\kappa_0$ and $\kappa_0=1.00$. Once the (uniform) value of $\delta$ is determined, that value and the measured values of $D_{ve}$ and $\delta/\kappa_0$ provide the property values $D_{ve}$, $\delta$ and $\kappa_0$ for each particle. In such a case, the size, mass and shape factor properties can be determined for each particle from sets of two or more TOF values. If the particle charge property is also desired, sets of three or more TOF values are required.

A simple variation of the above strategy occurs when the mass density or specific gravity of the particle material is known. In this case, measurement of sets of two or more TOF values provides $D_{ve}$ and $\delta/\kappa_0$ for each particle which, together with the known value of $\delta$, gives size, mass and shape factor properties for each particle.

Measurement of particles at low to moderate Re values and at low to non-negligible values of the particle Mach number $M=|U-V|/C$, where C is the local value of the sound velocity in the fluid, can be used to provide additional information about the properties of the particle. Although the Mach number dependence of f is only fully known for particles having spherical shape, measured data indicates that a strong shape dependence occurs in the Mach number correction to f. The Mach number correction to f is made utilizing a generalized version of $\kappa$ that includes dependence on Re and M having the form $\kappa=\kappa_0\ (1+a_1 \cdot Re^b1+a_2 \cdot M^b2)$ where $\kappa_0$ , $a_1$, $b_1$, $a_2$ and $b_2$ are constants. Measured data indicates that not only $\kappa_0$ but $a_2$ and/or $b_2$ and perhaps $a_1$ and/or $b_1$ are shape dependent at non-negligible M. Such a result is not surprising in consideration of the following two observations: (1) the gas compression near the front of a body that occurs when a body moves with significant M will contribute strongly to wake formation and associated form drag and (2) the relief of compression (drainage of compressed gas) from near the bow of the particle will be strongly dependent on particle shape. Although exact expressions or precise values of the coefficients are not yet available for calculation of a calibration database, empirical calibration data can be measured and used. Such data together with [2] and the generalized expression for $\kappa$ will allow estimation of the coefficients for various particle shapes and interpolation and extension of measured calibration data.

Although the additional shape dependence contained in the Mach number corrected version of f makes the calculation of such a calibration database complex, it also allows more accurate and complete determination of two or more of the size, mass, shape and charge properties or their equivalents of a particle from a simple set of measured TOF values.

Figure 2:
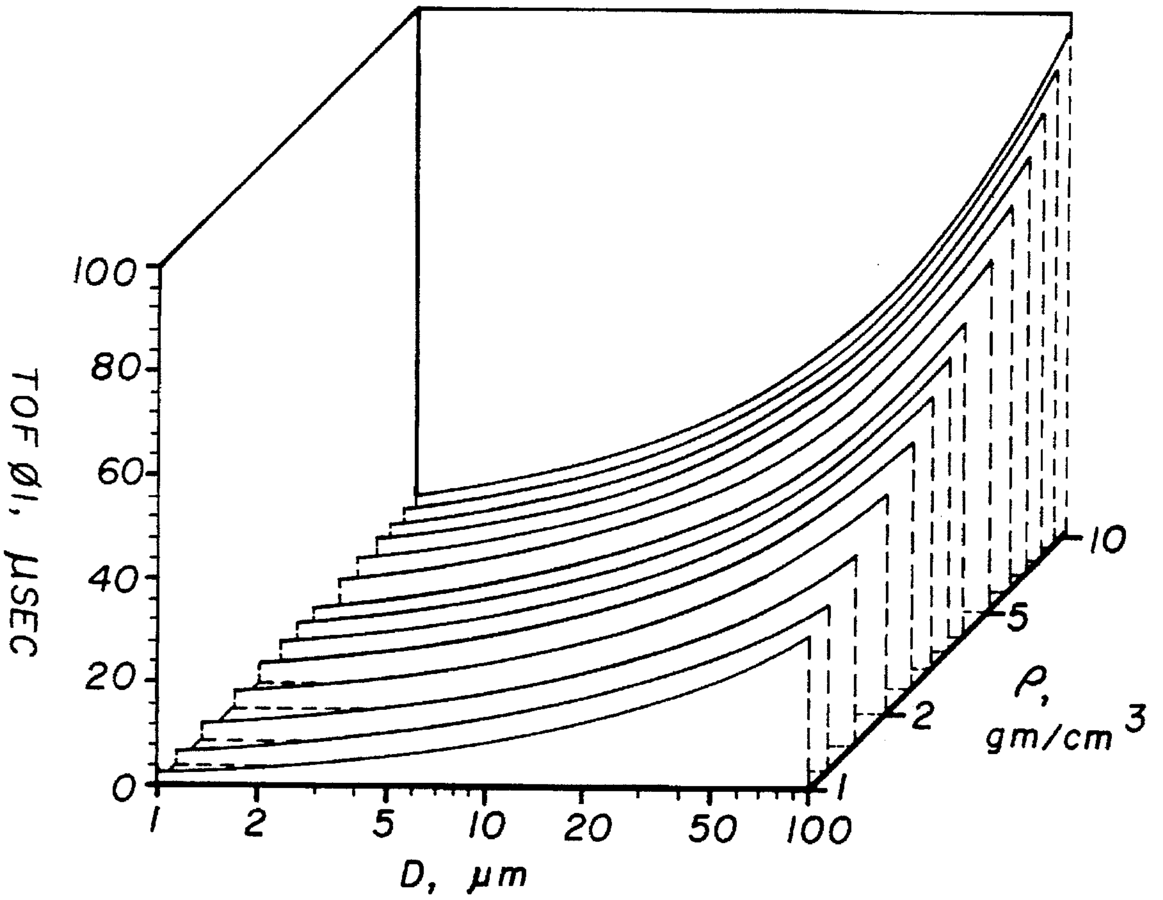
FIG. 2 contains curves on the surface of a three-dimensional plot of the TOF of a spherical particle between two detection locations 0 and 1 (TOF01) versus the particle diameter D and the particle mass density ρ.

Consider, for example, the measurement of the size and mass of spherical particles using apparatus 1 of FIG. 1 with the following conditions. The nozzle diameter is 1.00 mm, the nozzle included angle is 30°, the suspending gas is air having stagnation temperature of 293.16K and stagnation pressure of 750 torr and detection locations zero through three at 0.5, 1.5, 2.5 and 3.5 mm downstream separation from the nozzle exit plane. FIG. 2 shows calculated TOF versus spherical particle diameter D and mass density $\rho=\rho_0\delta$ with TOF01 being the TOF between detection locations zero and one. TOF02, being the TOF between detection locations zero and two, and TOF03, being the TOF between detection locations zero and three, can also be calculated. Comparison of measured TOF-set values of a particle 10 with these calibration data provides particle property values. For example, size and mass density of spherical particle 10 are properly selected when any two measured TOF values agree with their corresponding calculated TOF values at the correct D and $\rho$ values, subject to the uncertainties illustrated in Table 1 below. Comparison of a third measured TOF value with the corresponding calculated TOF value must also agree if the particle is spherical. If the third TOF value does not agree, the particle is not spherical.

It follows that the correct property values of size, mass and shape factor for particle 10 are determined by finding the size, mass and shape factor values for which three or more measured TOF values all agree with the corresponding calibration values. Since such agreement will only occur at the correct values of size, mass and shape factor, all three values are determined when such agreement is found. Some uncertainties in the values result from uncertainties in measured TOF values and other system parameters. Example values of the resolutions being the relative uncertainties dD/D and dY/Y obtainable in the measurement of D and $Y=\delta/\kappa_0$ where dD and dY are uncertainty in D and Y due to uncertainty of 0.05 μsec in measured TOF values are shown in Table 1 below for the conditions stated.

Calibration data have not yet been calculated for non-spherical shapes. For such shapes, empirical calibration data based on measured results for particles having known property values can be used to obtain values of size, mass and shape factor from three or more measured TOF values. However, in some cases property values of size and mass obtained by assuming a spherical shape are adequate for relative comparisons. In such cases, any set of at least two measured TOF values can be used to provide the values of size and mass that give the corresponding calibration TOF values for a sphere. These size and mass property values are denoted the size and mass property values of the equivalent TOF-set sphere. When a particle is non-spherical, these property values will generally depend on the measurement conditions such as nozzle and suspending gas properties and the number and locations of the detection locations. When these conditions are fixed, useful relative measures will be provided by device 1.

The measurement methods described herein can be used to obtain the double correlation function $C_2(\tau)$ from which the joint probability density distribution of particles over two-dimensional TOF-set space $\tau=\tau_1, \tau_2$ is provided. By a transformation using the calibration data of FIG. 2 and similar data for TOF02 and/or TOF03, the joint distribution of particle probability density over the equivalent TOF-set sphere property values D and $\rho$ or their equivalents can be determined. Likewise, the methods described herein can be used to provide the measurement of triple and higher correlation functions $C_n(\tau)$ with n=3, 4, 5, 6, . . . and $\tau=\tau_1, \tau_2, \ldots, \tau_n$. From the distribution of particles over these n TOF values, D and $\rho$ and additional property values can be obtained. For example, determination of particle D, $\rho$, shape factor and charge property values or their equivalents can be obtained from measurement of at least four TOF values for each particle.

Figure 3:
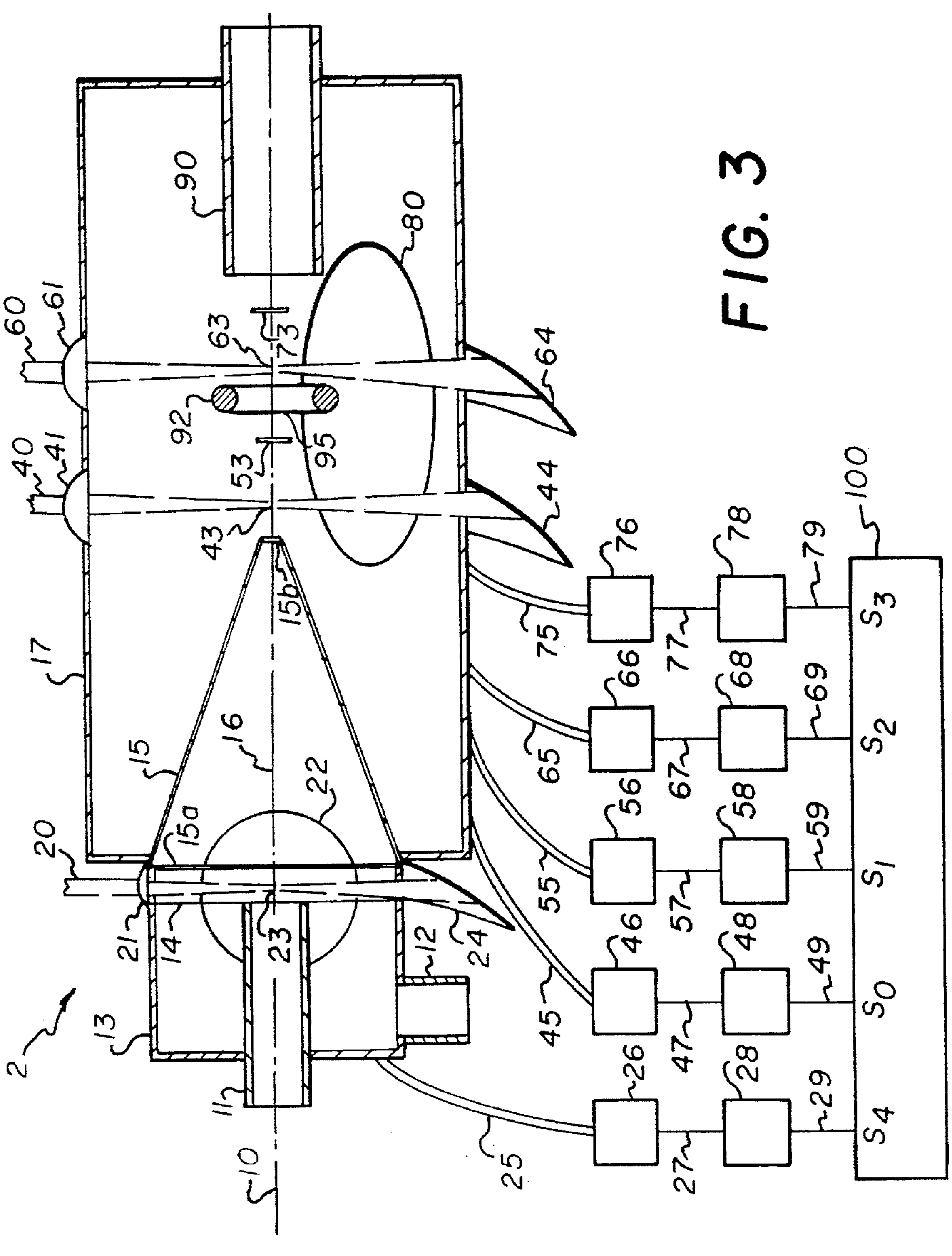
FIG. 3 is a block diagram of a second multiple TOF spectrometer device and associated signal processing equipment. In this device the motion of particles in a gas stream is the result of a location and particle property dependent aerodynamic force and, over a portion of their trajectories, of an electrostatic force. In this device a shock wave in a supersonic gas jet causes large relative gas-particle velocities.

Illustrated in FIG. 3 is a Particle TOF Spectrometer device 2 which is used to measure the set of TOF values of at least one particle. This set can be used to determine at least two of the size, mass, shape factor and charge properties of the particle. Many of the elements of device 2 are identical to those of device 1. However, some new elements are shown in device 2 which are now described.

In device 2, screen 14 is a metal electrode screen in addition to a laminating screen as previously described. Electrode screen 14 serves to establish the electrostatic potential across the plane of screen 14 and to uniformly distribute the flow over the cross-section of the inlet plane of nozzle 15. The voltage of screen 14 is zero volts since it is grounded to duct 13 and duct 11.

In device 2, an additional detection location, being detection location four, is provided by use of laser light beam 20 from a source, not shown. Laser beam 20 is focused by cylindrical lens window 21 to a thin sheet of illumination 23 in the region near axis 16. After passing axis 16, laser beam 20 is directed into light trap 24. A portion of scattered illumination signal from particle 10 in thin illumination sheet 23 passes through a transparent wall of nozzle 15, is collected by lens 22 and then focused onto the face of optical fiber 25, which transmits the scattered light signal to PMT detector 26. The face of optical fiber 25, hidden in FIG. 3 behind duct 13, is located by means not shown at the object point of collector lens 22 corresponding to the image point located at the intersection of thin sheet of illumination 23 and axis 16. Negative current pulse from PMT detector 26 is conducted by coaxially shielded cable 27 to time-marker-pulse generator or signal conditioner 28 which converts the negative current pulse from PMT detector 26 into a positive transistor-transistor-logic (TTL) compatible voltage pulse having fixed width and amplitude irrespective of the size, shape and other properties of particle 10. The positive voltage pulse output signal of electronic signal conditioner 28 is a narrow, shaped, voltage pulse that occurs at the time of passage of any particle 10 past detection location four within thin sheet of illumination 23. The positive voltage pulse output signal of conditioner 28 is conducted coaxially shielded cable 29 to input $S_4$ of multi-dimensional correlation computer 100. Positive voltage pulses from signal conditioners 48 and 58 are conducted via coaxially shielded cables 49 and 59 to inputs $S_0$ and $S_1$ of multi-dimensional correlation computer 100. Additional signals from signal conditioners 68 and 78 are also conducted to inputs $S_2$ and $S_3$ of multi-dimensional correlation computer 100.

In device 2, nozzle 15 is fabricated out of a transparent dielectric material. On its inner surface near each end of nozzle 15 is deposited a thin conducting electrode strip of material of high electrical conductivity. Electrode strip 15*a* lies at the inlet end of nozzle 15 near the intersection of the conical inner surface of nozzle 15 and duct 13. This electrode strip is in contact with duct 13 and is therefore maintained at the potential of duct 13 and screen 14. Electrode strip 15*b* lies on the conical inner surface at the exit end of nozzle 15 near the exit plane. However, electrode strip 15*b* does not extend past the exit plane. Electrode strip 15*b* is connected by means not shown to power supply means not shown by which the potential of electrode 15*b* is maintained at selected positive or negative or alternating value. Connecting strip electrodes 15*a* and 15*b* and not visible in FIG. 3 are 36 thin, uniform strips of surface deposited semi-conductor material centered on lines defined by the intersection of the inner conical surface of nozzle 15 and a series of planes through axis 16 such that the angular increment between the planes is 10 degrees. Although 36 is a preferred number of such planes, other numbers between 12 and 72 are also preferred, resulting in 12 to 72 lines of semi-conductor material deposited on the inner conical surface of nozzle 15 connecting electrode strips 15*a* and 15*b*. Each of these lines of semi-conductor material is deposited such that the product of width and thickness, i.e., the cross-section and thus the electrical resistance, is substantially uniform along the line length. Consequently, a uniform electrostatic potential field $E=-\phi/L$ is imposed near axis 16 between screen 14 and the exit plane of nozzle 15 having strength controlled by the potential $\phi$ imposed on electrode 15*b* and the length L of nozzle 15.

To measure the size, mass, shape factor and charge of particle 10 suspended in air flowing into inlet 11, four TOF values are determined for the case when the pressure in chamber 17 is maintained near or below 0.01 atmosphere. As illustrated in Tables 2 and 3 for the conditions stated, when a field is imposed between screen 14 and nozzle exit strip 15*b*, the charge property of particle 10 strongly influences its TOF between detection location four within thin illumination sheet 23 and subsequent detection locations while its TOF between any pair of subsequent detection locations is not significantly affected. Thus, as indicated in the above description of device 1, the mass, size and shape factor of particle 10 can be determined by use of three or more measured TOF values for the motion of particle 10 between detection locations beyond the exit of nozzle 15. In addition, the measured TOF for particle 10 between detection locations four and zero within thin illumination sheets 23 and 43 allows determination of the charge property of particle 10. The calibration curve by which the charge property is determined from this measured TOF value and the known values of mass, size and shape factor is determined by solving [2] with the appropriate field strength E. Example calculated results are shown in Tables 2 and 3 below which indicate the resolution obtainable, down to fractions of a proton charge, which will not be observed in a real system but are included to indicate resolving power.

The complete set of TOF values for one or more individual particle 10 measurements is provided by the correlation function $C_4(\tau)$ with $\tau=\tau_1, \tau_2, \tau_3, \tau_4$, where $\tau_4$ is defined as TOF40, being the TOF between detection locations four and zero, and $\tau_1$, $\tau_2$ and $\tau_3$ are defined as above as TOF01, TOF02 and TOF03. The distribution of particles over sets of values of $\tau_1$, $\tau_2$, $\tau_3$, $\tau_4$ or any subset thereof is provided by the noise corrected correlation function $C_4(\tau)$ or its equivalent. Measurement of fewer TOF values provides the equivalent TOF-set sphere property values of mass, size and charge. When operating at low jet velocities so that the particle motion is controlled by $D_{ae}$, measurement of two or more TOF values provides the values of $D_{ae}$ and charge for each particle measured.

Determination of the properties of particle 10 may be substantially enhanced by measuring TOF values for different portions of the trajectory of particle 10 over which the particle experiences a wide range of relative particle-gas velocities resulting in a wide range of Re and M values. Measurement of the TOF values for particle 10 between detection locations four and zero within thin illumination sheets 23 and 43 with no electrostatic field applied and between detection locations within 43 and one or more of 53, 63 or 73 provides such a wide range when the gas flow is supersonic in chamber 17. Since particle 10 is moving most slowly near 23, the first TOF will be strongly weighted, indeed, dominated, by the low velocity motion of particle 10 near thin sheet of illumination 23. Subtle influences of shape and other particle properties that depend on Re and/or M will be most apparent when comparing TOF values over motions of particle 10 where Re and/or M vary over a broad range.

Illustrations of the measurement capabilities of the methods described here are shown in Tables 1, 2 and 3 below. Table 1 shows selected values from a calculated calibration database like that of FIG. 2 but consisting of sets of only two TOF values between three different detection locations as indicated. The corresponding diameter and specific gravity values for spherical particles or of diameter and $Y=\delta/\kappa_0$ or their equivalents for particles of other shapes are given, where $\delta$ is the specific gravity of the particle material. Also shown in Table 1 are the resolutions, i.e., the relative uncertainties, in the determination of the size and mass density properties or their equivalents obtainable for the stated conditions. Note that these resolution values can be reduced by reducing the uncertainty by which the TOF values are determined below the specified value of 0.05 μsec or by increasing the TOF values by extending the path lengths between detection locations to larger lengths than those specified or by reducing the nozzle diameter or gas pressure.

Tables 2 and 3 provide calculated calibration data for the determination of size and charge of spherical particles of known mass density from measured sets of two TOF values. While the calibration data listed in these tables is not comprehensive, the data demonstrates that both size and charge of particles of known shape and density can be measured to good resolution by the methods described. These data also demonstrate the methodology for calculating a complete size/charge database for particles of specified shape and mass density. While the data shown are for spherical particles, the calculation methods can be applied for particles of any specified shape and mass density.

The data listed in Tables 1, 2 and 3 were calculated for the following conditions unless otherwise indicated in the Tables:

particle mass density:

1.00 gm/cm$^3$ (Tables 2 and 3)

nozzle 15 geometry:

conical converging nozzle of 15° half-angle and 1.00 mm diameter at the nozzle exit detection locations:

$x_1$=−15.00 mm, $x_2$=+0.50 mm, $x_3$=+1.50 mm, where x=0 is the nozzle exit plane fluid:

air at stagnation properties T=293.16K and P=750.0 torr

TOF uncertainty:

±0.05 μsec flow direction:

vertical downward field strength:

−10,000 V/cm (Tables 2 and 3)

notation:

$\tau_1$=TOF between $x_1$ and $x_2$ $\tau_2$=TOF between $x_2$ and $x_3$ $\tau_1^0$=TOF of an uncharged particle between $x_1$ and $x_2$ (Tables 2 and 3)

TABLE 1

| $D_{ev}$ (μm) | $\gamma = \sigma/\kappa_0$ | $\tau_1$ (μsec) | $\tau_2$ (μsec) | dD/D | dγ/γ |
|---|---|---|---|---|---|
| 1.0 | 1.00 | 2295.3957 | 3.0003 | 0.1840 | 0.3331 |
| 2.0 | 1.00 | 2325.0519 | 4.0419 | 0.0987 | 0.1847 |
| 3.0 | 1.00 | 2364.3701 | 4.9430 | 0.0661 | 0.1248 |
| 5.0 | 1.00 | 2461.2320 | 6.3867 | 0.0416 | 0.0787 |
| 10.0 | 1.00 | 2751.2748 | 9.0973 | 0.0242 | 0.0454 |
| 100.0 | 1.00 | 6409.5639 | 30.0816 | 0.0083 | 0.0128 |
| *1.0 | 1.00 | 2295.4387 | 3.0003 | 0.1823 | 0.3299 |
| *10.0 | 1.00 | 2754.9424 | 9.0974 | 0.0241 | 0.0452 |
| *100.0 | 1.00 | 7489.8268 | 30.0909 | 0.0065 | 0.0107 |
| 1.0 | 2.00 | 2307.4210 | 3.6475 | 0.1259 | 0.2285 |
| 10.0 | 2.00 | 3028.0029 | 12.0688 | 0.0174 | 0.0324 |
| 100.0 | 2.00 | 6912.2066 | 41.6425 | 0.0132 | 0.0121 |
| 1.0 | 5.00 | 2338.5759 | 4.9512 | 0.0785 | 0.1428 |
| 10.0 | 5.00 | 3597.6267 | 17.9120 | 0.0113 | 0.0209 |
| 100.0 | 5.00 | 6382.0800 | 64.2757 | 0.0019 | 0.0038 |
| 1.0 | 10.00 | 2382.6717 | 6.3860 | 0.0565 | 0.1030 |
| 10.0 | 10.00 | 4236.9259 | 24.4554 | 0.0081 | 0.0150 |

*Upward flow

TABLE 2

| $D_{ev}$ (μm) | q proton charges | q · E* | $\tau_1$ (μsec) | $\tau_2$ (μsec) | $\tau_1 - \tau_1^0$ (μsec) |
|---|---|---|---|---|---|
| 1.00 | 10,000 | $-1 \times 10^8$ | ** | ** | ** |
| 1.00 | 5,000 | $-5 \times 10^7$ | ** | ** | ** |
| 1.00 | 2,000 | $-2 \times 10^7$ | 6,229.0147 | 3.0020 | 3,933.6190 |
| 1.00 | 1,000 | $-1 \times 10^7$ | 3,185.0652 | 3.0012 | 889.6695 |
| 1.00 | 500 | $-5 \times 10^6$ | 2,655.4359 | 3.0007 | 360.0402 |
| 1.00 | 200 | $-2 \times 10^6$ | 2,425.1356 | 3.0005 | 129.7399 |
| 1.00 | 100 | $-1 \times 10^6$ | 2,358.2225 | 3.0004 | 62.8268 |
| 1.00 | 50 | $-5 \times 10^5$ | 2,326.3249 | 3.0003 | 30.9292 |
| 1.00 | 20 | $-2 \times 10^5$ | 2,307.6544 | 3.0003 | 12.2587 |
| 1.00 | 10 | $-1 \times 10^5$ | 2,301.5065 | 3.0003 | 6.1108 |
| 1.00 | 5 | $-5 \times 10^4$ | 2,298.4465 | 3.0003 | 3.0508 |
| 1.00 | 2 | $-2 \times 10^4$ | 2,296.6149 | 3.0003 | 1.2192 |
| 1.00 | 1 | $-1 \times 10^4$ | 2,296.0051 | 3.0003 | 0.6094 |
| 1.00 | 0.5 | $-5 \times 10^3$ | 2,295.7004 | 3.0003 | 0.3047 |
| 1.00 | 0.2 | $-2 \times 10^3$ | 2,295.5176 | 3.0003 | 0.1219 |
| 1.00 | 0.1 | $-1 \times 10^3$ | 2,295.4567 | 3.0003 | 0.0610 |
| 1.00 | 0.0 | 0.0 | 2,295.3957 | 3.0003 | 0.0000 |
| 1.00 | −1 | $+1 \times 10^4$ | 2,294.7867 | 3.0003 | −0.0609 |
| 1.00 | −10 | $+1 \times 10^5$ | 2,289.3223 | 3.0003 | −6.0734 |
| 1.00 | −100 | $+1 \times 10^6$ | 2,236.3936 | 3.0003 | −59.0021 |
| 1.00 | −1,000 | $+1 \times 10^7$ | 1,834.6393 | 2.9994 | −460.7564 |
| 1.00 | −10,000 | $+1 \times 10^8$ | 767.4006 | 2.9914 | −1,527.9951 |

*dimensions of protons · V/cm

**denotes particle did not penetrate field in nozzle

TABLE 3

| $D_{ev}$ (μm) | q proton charges | q · E* | $\tau_1$ (μsec) | $\tau_2$ (μsec) | $\tau_1 - \tau_1^0$ (μsec) |
|---|---|---|---|---|---|
| 10.0 | 10,000 | $-1 \times 10^8$ | 3,456.6700 | 9.1015 | 705.3952 |
| 10.0 | 5,000 | $-5 \times 10^7$ | 3,058.2292 | 9.0994 | 306.9544 |
| 10.0 | 2,000 | $-2 \times 10^7$ | 2,865.4996 | 9.0982 | 114.2248 |
| 10.0 | 1,000 | $-1 \times 10^7$ | 2,807.0863 | 9.0977 | 55.8115 |
| 10.0 | 500 | $-5 \times 10^6$ | 2,778.8749 | 9.0975 | 27.6001 |
| 10.0 | 200 | $-2 \times 10^6$ | 2,762.2376 | 9.0975 | 10.9628 |
| 10.0 | 100 | $-1 \times 10^6$ | 2,756.7432 | 9.0973 | 5.4684 |
| 10.0 | 50 | $-5 \times 10^5$ | 2,754.0073 | 9.0973 | 2.7325 |
| 10.0 | 20 | $-2 \times 10^5$ | 2,752.3670 | 9.0973 | 1.0922 |
| 10.0 | 10 | $-1 \times 10^5$ | 2,751.8208 | 9.0973 | 0.5460 |
| 10.0 | 5 | $-5 \times 10^4$ | 2,751.5478 | 9.0973 | 0.2730 |
| 10.0 | 2 | $-2 \times 10^4$ | 2,751.3840 | 9.0973 | 0.1092 |
| 10.0 | 1 | $-1 \times 10^4$ | 2,751.3294 | 9.0973 | 0.0546 |
| 10.0 | 0.0 | 0.0 | 2,751.2748 | 9.0973 | 0.0000 |
| 10.0 | −1 | $+1 \times 10^4$ | 2,751.2202 | 9.0973 | −0.0546 |

TABLE 3-continued

| $D_{ev}$ (μm) | q proton charges | q · E* | $\tau_1$ (μsec) | $\tau_2$ (μsec) | $\tau_1 - \tau_1^0$ (μsec) |
|---|---|---|---|---|---|
| 10.0 | −10 | $+1 \times 10^5$ | 2,750.7291 | 9.0973 | −0.5457 |
| 10.0 | −100 | $+1 \times 10^6$ | 2,745.8291 | 9.0973 | −5.4457 |
| 10.0 | −1,000 | $+1 \times 10^7$ | 2,697.8478 | 9.0969 | −53.4270 |
| 10.0 | −10,000 | $+1 \times 10^8$ | 2,310.2716 | 9.0930 | −441.0032 |

*dimensions of protons · V/cm

Enhanced determination of property values of particle 10 are provided by measurement of the set of TOF values of a particle over two or more flight paths in which, or preceding which, highly disparate values of Re and/or M occur, such as caused by a shock wave. In both devices 1 and 2, the gas flow and the particles suspended therein are carried out of chamber 17 via exit duct 90 by pumping means not shown. In preferred embodiments described above the gas pressure in chamber can be maintained at a sufficiently low level to support a supersonic free-jet near axis 16 and upstream of the shock that occurs at or near the entrance to exit duct 90. The location of this shock wave where the gas velocity suddenly changes from supersonic to subsonic can be stabilized at a selected location by use of stabilizer ring or hole-containing-plate 92 centered on axis 16 of FIG. 3 supported by means not shown. This ring or hole-containing-plate or other such device serves the function of upsetting the supersonic gas flow and causing an attached (location stabilized) shock wave 95 while allowing the central core of the gas flow and the suspended particles to pass with substantially undeflected trajectories.

The influence of particle Reynolds and Mach numbers on particle motion in device 2 is enhanced by use of stabilizer ring 92 and attached shock wave 95. Because a supersonic gas flow obtains a very sudden and substantial velocity decrease at the shock wave, accompanied by substantial changes in other gas properties, small particles suspended in such a flow will obtain large Reynolds number and Mach number values upon passing through the shock wave. A set of two TOF values for a particle traversing two segments of its flight path wherein a shock wave occurs upstream of or within one of the flight path segments provides improved information about the properties of a small particle compared to the case when no shock wave occurs.

This embodiment illustrates how, in the method of determining two or more properties of a particle being accelerated in an acceleration region by a drag force acting on the particle by measuring a set of at least two TOF values of the particle between at least two pairs of detection locations and comparing the measured TOF set to calibration data, (a) the magnitude of the drag force acting on the particle in the suspending fluid is amplified by a change in the velocity of the fluid caused by at least one obstruction or diversion in a stream of the fluid, (b) for a particle suspended in a gas, the acceleration of the particle can be caused in the acceleration region by expansion of the gas through a tube, duct, nozzle or orifice from a region of higher gas pressure to a region of lower gas pressure, (c) for a particle suspended in a gas in supersonic flow, the gas in the acceleration region can contain at least one shock wave between at least one region of supersonic gas flow and at least one region of subsonic gas flow and (d) the fluid is a gas and the magnitude of the acceleration of the particle is amplified in the acceleration region by compression of the gas within a tube, duct, chamber or diffuser within which the gas flows from a region of lower gas pressure and higher gas velocity to a region of higher gas pressure and lower gas velocity. Note that the fluid acceleration and particle drag force are positive and negative in this embodiment in different portions of the acceleration region.

A preferred embodiment of the present invention provides improved sensitivity and accuracy in the analysis of relatively non-volatile material dissolved and/or suspended in a relatively volatile liquid. By spraying droplets of the liquid of known size or mass or volume distribution into a gas and evaporating the relatively volatile components, utilizing means not shown, residue particles of the relatively non-volatile material are produced in suspension in the gas. The gas containing said residue particles is conducted to inlet 11 of device 1 or 2 and the TOF-sets are measured for each residue particle. The measured TOF-sets are used with calibration data to determine the mass or volume of each residue particle. Also determined by other means is the mass or volume of the liquid from which the residue particles originated.

The mass concentration or mass fraction of the dissolved and/or suspended relatively non-volatile material is determined by dividing the mass of the residue particles by the volume or mass of liquid sample from which the residue particles originated. Alternatively, the volume fraction or specific volume of the dissolved and/or suspended relatively nonvolatile material is determined by dividing the volume of the residue particles by the volume or mass of liquid sample from which the residue particles originated. Analysis of liquid samples for relatively non-volatile material dissolved and/or suspended therein is thereby accomplished.

This method of analysis of liquid samples provides improved sensitivity and accuracy. Because large droplets having diameter of the order of 100 μm can be readily sprayed and dried while small particles having diameter of the order of 0.1 μm can be detected and characterized by device 1 or 2, sensitivity of the order of parts per billion is expected for any relatively non-volatile material, with higher sensitivity provided when larger droplets and smaller particle detections are obtained. Because the residue particle properties are more accurately characterized by the methods described herein and used in device 1 or 2, the size, mass or volume of residue particles is determined with improved accuracy, providing improved accuracy in the analysis of the dissolved and/or suspended material in the liquid samples. Since the mass or volume of residue particle material is determined directly, uncertainty due to material dependent detection efficiency such as in optical or mass spectroscopy does not influence the accuracy of the analysis.

When a chromatographic device such as a high performance liquid chromatographic (HPLC) device is utilized, the various dissolved or suspended species of relatively non-volatile material are isolated in a liquid stream into separate, limited volumes of liquid that elute from the HPLC or other separating device at different times. Spaying and evaporating droplets of the liquid of this eluting stream forms residue particles suspended in gas. These residue particles are characterized by use of device 1 or 2 for each of a series of limited volumes of the liquid sample eluting from the HPLC or other separating device. In limited volumes of eluting liquid containing no dissolved or suspended species other than those present as background contamination, the total mass or volume of the residue particles provides a baseline value of mass or volume per limited volume of eluting liquid. The total mass or volume of residue particles from each limited volume of eluding liquid or from each "elution peak species" into which a dissolved or suspended material species has been isolated and concentrated exceeds the baseline value by a mass or volume amount equal to the mass or volume of the dissolved or suspended species that was present in the original liquid sample. This mass or volume amount is determined by subtraction of the background mass or volume amount in the limited volume of the eluted liquid from the total mass or volume of residue particles from the same limited volume.

Measurement of the mass or volume of residue particles associated with each elution peak species provides the analysis of dissolved and/or suspended relatively non-volatile material in the original liquid sample. This analysis can be stated as the mass or volume of each elution peak species or the mass or volume amounts for each elution peak species can be divided by the mass or volume of the original liquid sample or they can be divided by the mass or volume of the limited volume of eluted liquid. In any of these cases the size, mass or volume distribution of the sprayed droplets is not required since the total mass or volume of each elution peak species represents the amount of material originating from the original volume of liquid sample.

The method of this invention used in determining the mass or volume of residue particles can be applied in determining the amount of relatively non-volatile material dissolved and/or suspended in a relatively volatile liquid or in a limited liquid volume containing an elution peak species by means of the following procedure. The mass concentration, mass fraction or mass of relatively non-volatile material dissolved and/or suspended in a liquid is determined by (a) one or more droplets of the liquid is sprayed into a gaseous suspending fluid wherein the droplets so produced have known uniform size, volume or mass or a known distribution of non-uniform size, volume or mass or an unknown distribution of size, volume or mass, (b) the relatively volatile components of the droplets are evaporated leaving one or more residue particles composed of the relatively non-volatile material suspended in the gaseous suspending fluid, (c) the residue particles are characterized by the methods of this invention and the desired quantity is obtained by (d) determining the mass concentration of the relatively non-volatile material in the liquid by dividing the measured mass of the residue particles by the volume of the liquid droplets from which the relatively non-volatile material originated, or, determining the mass fraction of the relatively non-volatile material in the liquid by dividing the measured mass of the residue particles by the mass of the liquid droplets from which the relatively non-volatile material originated, or, determining the mass of a species of the relatively non-volatile material in at least one limited volume of the liquid after the species has been isolated and/or concentrated in the limited volume by (A) multiplying the mass concentration of the species in the limited volume by the limited volume, or (B) multiplying the mass fraction of the species in the limited volume by the mass of the limited volume, or (C) summing the measured masses of the residue particles resulting from the droplets from the limited volume.

The method of this invention used in determining the mass or volume of residue particles can be applied in determining the amount of relatively non-volatile material dissolved and/or suspended in a relatively volatile liquid or in a limited liquid volume containing an elution peak species by means of the following procedure. The volume fraction, specific volume or volume of relatively non-volatile material dissolved and/or suspended in a liquid is determined by (a) one or more droplets of the liquid is sprayed into a gaseous suspending fluid wherein the droplets so produced have known uniform size, volume or mass or a known distribution of non-uniform size, volume or mass or an unknown distribution of size, volume or mass,(b) the relatively volatile components of the droplets are evaporated leaving one or more residue particles composed of the relatively non-volatile material suspended in the gaseous suspending fluid, (c) the residue particles are characterized by the methods of this invention and the desired quantity is obtained by (d) determining the volume fraction of the relatively non-volatile material in the liquid by dividing the volume of the residue particles obtained from the measured size, shape factor, mass or other properties by the volume of the liquid droplets from which the relatively non-volatile material originated, or, determining the specific volume of the relatively non-volatile material in the liquid by dividing the volume of the residue particles obtained from the measured size, shape factor, mass or other properties by the mass of the liquid droplets from which the relatively non-volatile material originated, or, determining the volume of a species of the relatively non-volatile material in at least one limited volume of the liquid after the species has been isolated and/or concentrated in the limited volume by (A) multiplying the volume fraction of the species by the limited volume, or (B) multiplying the specific volume of the species by the mass of the limited volume, or (C) summing the volumes of the residue particles resulting from the droplets from the limited volume.

While each detection location in both devices 1 and 2 is shown with its own "dedicated" detector, scattered illumination signals from two or more detection locations can be transmitted to a single detector and the signal pulses from that detector and its signal conditioning circuitry transmitted to two or more inputs of multi-dimensional correlation computer 100. In such a case the correlation function obtained is $$C_n(\tau)=\langle S_{m0}(t)\cdot S_{m1}(t+\tau_1)\cdot \ldots \cdot S_{mn}(t+\tau_n)\rangle$$

where any of the $m_0, m_1, \ldots, m_n$ signals may originate from any number of detectors from 1 to n+1, e.g., $S_{m2}(t)$ may equal $S_{m3}(t)$.

Thus, $C_n(\tau)$ may be a full cross-correlation function (n+1 detectors and n+1 separate signals), a full auto-correlation function (1 detector and one signal) or any combination of cross- and auto-correlation function in between these extremes (2 to n detectors and 2 to n signals). In cases where n+1−m detectors are used with m=0,1,2,3, . . . , n the distribution of particle probability density is jointly given over only a reduced number of TOF variables and one or more of these TOF variables may contain TOF values for particle flights between at least two pairs of detection locations.

For example, let signals $S_4(t)$ and $S_0(t)$ of device 2 be combined on the $S_0$ input of processor 100 and signals $S_1$, $S_2$ and $S_3$ be transmitted to inputs $S_1$, $S_2$ and $S_3$, respectively. In addition to artifactual $\tau_4$ values due to the normal detector noise and to $S_4$ and $S_0$ pulses corresponding to different particles, the $\tau_4$ values at which particle counts are registered are (1) the TOF40 values and (2) the intervals between two particles arriving at detection location four and (3) the intervals between two particles arriving at detection location zero. The $\tau_2$ values at which particle counts are registered in addition to those due to noise and uncorrelated pulse pairs are (1) the TOF values for each particle between detection locations four and one and (2) the TOF values for each particle between detection locations zero and one. Similar statements apply for the other $\tau$ variables. This example serves to illustrate the value of the full cross-correlation function in providing the full TOF information: the joint distribution of particle probability density over each of the TOF variables. Other methods of measuring and recording the TOF data are also deficient to the use of the full cross-multi-dimensional correlation method in providing complete TOF information.

Other embodiments wherein particle property values are determined by measuring particle TOF values or velocities in a spatially or temporally changing flow field invoke the same principles described above for the stationary nozzle or jet flow field. One preferred embodiment measures particles in the flow region upstream of a body in a jet or duct flow. In this and other similar ones, equation [2] is solved to obtain the calibration database using the flow field upstream of the body and the forces acting on the particle as described above. Apparatus similar to devices 1 and 2 are installed in and near the jet or duct and used to measure a set of TOF values for each particle. The comparison of measured TOF-set data and calibration data allows determination of two or more property values for each particle. Such other embodiments may provide advantages such as in situ measurement of suspended particles in a duct flow.

While there has been shown what is considered to be the preferred embodiment of the present invention, it will be manifest that many changes and modifications may be made therein without departing from the essential spirit of the invention. It is intended, therefore, in the annexed claims to cover all such changes and modifications as may fall within the true scope of the invention.

I claim:

1. A method of measuring at least two distinct properties of a single particle comprising:

a) accelerating a particle having a certain velocity in at least one acceleration region, said acceleration region being a region in which said velocity of said particle changes, to cause said velocity of said particle to vary;

b) detecting a passage of said particle at each of three or more locations within or near said acceleration region;

c) measuring a set of time-of-flight values for said particle, each said time-of-flight value being equal to a time interval between said passage of said particle at two of said locations; and d) determining the values of at least two properties of said particle by comparing said set of time-of-flight values for said particle with calibration data.

2. The method of claim 1 wherein acceleration of said particle in said acceleration region is caused by a drag force acting on said particle in a suspending fluid and/or by an imposed electromagnetic field.

3. The method of claim 2 wherein said suspending fluid is a gas.

4. The method of claim 2 wherein one of said at least two properties is a size, mass, electric charge, or shape factor.

5. The method of claim 1 wherein said comparing said set of time-of-flight values for said particle with said calibration data is used to determine a diameter of said particle.

6. The method of claim 4 wherein a mass property m of said particle is determined by a) an equivalent volume sphere diameter $D_{ve}$ and a mass density property $\rho=\rho_0\delta$ where $\rho_0$ gm/cm$^3$ and $\delta$ is a specific gravity of material of said particle and said mass property is calculated by $m=\pi/6\cdot\rho_0\delta D_{ve}^3$ or b) an equivalent envelope volume sphere diameter $D_{eve}$ and an effective mass density property $\rho=\rho\delta_a$ where $\rho_0$ is 1 gm/cm$^3$ and $\delta_a$ is an apparent specific gravity of the material of said particle and said mass property is calculated by $m=\pi/6\cdot\rho_0\delta_a D_{eve}^3$.

7. The method of claim 4 wherein said shape factor is an aerodynamic or hydrodynamic shape factor.

8. The method of claim 2 wherein one of at least two properties which is determined for said particle is an equal time-of-flight sphere diameter of said particle defined as the diameter of a sphere having at least one time-of-flight value equal to at least one measured time-of-flight value of said particle.

9. The method of claim 2 wherein said drag force acting on said particle has a magnitude in said suspending fluid which is amplified by a change in the velocity of said suspending fluid caused by at least one obstruction in a stream of said fluid.

10. The method of claim 3 wherein said acceleration of said particle is caused in said acceleration region by expansion of said gas through a tube, duct, nozzle or orifice from a region of higher gas pressure to a region of lower gas pressure.

11. The method of claim 3 wherein said gas in said acceleration region contains at least one shock wave between at least one region of supersonic gas flow and at least one region of subsonic gas flow.

12. The method of claim 9 wherein said suspending fluid is a gas and the magnitude of said acceleration of said particle is amplified in said acceleration region by compression of said gas within a tube, duct, chamber or diffuser within which said gas flows from a region of lower gas pressure and higher gas velocity to a region of higher gas pressure and lower gas velocity.

13. The method of claim 1 wherein an acoustic or electromagnetic time-marker-signal is generated at the passage of said particle at each of said locations.

14. The method of claim 13 wherein at least one detector is used for detecting all of said passages of said particle at said locations.

15. The method of claim 13 wherein at least one of said time-marker-signals is generated by detection of scattered light resulting from illumination of said particle in the region of at least one of said locations using at least one light sensitive detector.

16. The method of claim 1 wherein a signal generated at said passage of said particle at each of said locations is monitored to determine the precise moment of passage of said particle at each said location and a set of n time-of-flight values for each said particle between a set of n+1 locations is determined by measurement or computation of an n-dimensional correlation function $C_n(\tau_1, \tau_2, \ldots, \tau_n)$, or a function derivable therefrom, of said signals generated at said passages of said particle at said locations, where $C_n(\tau_1, \tau_2, \ldots, \tau_n)=\langle S_0(t)\cdot S_1(t+\tau_1)\cdot S_2(t+\tau_2)\cdot \ldots \cdot S_n(t+\tau_n)\rangle$, n=2, 3, 4, 5, 6, 7, . . . , $\tau_1$, $\tau_2$ is said set of n time-of-flight values, $S_0(t)$, $S_1(t)$, . . . , $S_n(t)$ are n+1 signals containing pulses denoting said passage of said particle past said detection locations, and the angular brackets <> denote that a quantity contained therein is averaged over time t; and said function derivable therefrom is a function resulting from other signal processing means that contains equivalent information.

17. The method of claim 16 wherein said signal is an acoustic or electromagnetic time-marker-signal generated at the passage of said particle at each of said locations.

18. The method of claim 16 wherein said value of n is 2 and a double correlation function $C_2(\tau)$ of said signals generated at the passage of said particle at three of said locations or said value of n is 3 and a triple correlation function $C_3(\tau)$ of said signals generated at the passage of said particle at four of said locations is measured or computed, where the vector $\tau$ denotes said set of time-of-flight values $\tau_1$ and $\tau_2$ or $\tau_1$, $\tau_2$, and $\tau_3$.

19. The method of measuring the mass concentration, mass fraction or mass of relatively non-volatile material dissolved and/or suspended in a relatively volatile liquid or in a limited liquid volume containing a single elution peak species of relatively non-volatile material comprising:

a) spraying at least one droplet of a volume of liquid into a gaseous suspending fluid;

b) evaporating relatively volatile components of said droplet leaving at least one residue particle composed of relatively non-volatile material suspended in said gaseous suspending fluid;

c) accelerating said residue particle having a certain velocity in at least one acceleration region, said acceleration region being a region in which said velocity of said residue particle changes, to cause said velocity of said residue particle to vary;

d) detecting a passage of said residue particle at each of three or more locations within or near said acceleration region;

e) measuring a set of time-of-flight values for said residue particle, each said time-of-flight value being equal to a time interval between said passage of said residue particle at two of said locations; and f) determining a mass property of said residue particle by comparing said set of time-of-flight values for said residue particle with calibration data;

g1) determining a mass concentration of said relatively non-volatile material in said liquid by dividing said mass of said residue particle by a volume of said liquid droplet from which said relatively non-volatile material of said residue particle originated; or g2) determining a mass fraction of said relatively non-volatile material in said liquid by dividing said mass of said residue particle by a mass of said liquid droplet from which said relatively non-volatile material of said residue particle originated; or g3) determining a mass of a species of a relatively non-volatile material in a limited volume of said liquid after said species has been isolated and/or concentrated in said limited volume of liquid by either a1) multiplying said mass concentration of said species in said limited volume by said limited volume, or a2) multiplying said mass fraction of said species in said limited volume by a mass of said limited volume, or a3) summing said mass of each said residue particle of said species in said limited volume resulting from said droplet from said limited volume.

20. The method of measuring the volume fraction, specific volume or volume of relatively non-volatile material dissolved and/or suspended in a relatively volatile liquid or in a limited liquid volume containing a single elution peak species of relatively non-volatile material comprising:

a) spraying at least one droplet of a volume of liquid into a gaseous suspending fluid;

b) evaporating relatively volatile components of said droplet leaving at least one residue particle composed of relatively non-volatile material suspended in said gaseous suspending fluid;

c) accelerating said residue particle having a certain velocity in at least one acceleration region, said acceleration region being a region in which said velocity of said residue particle changes, to cause said velocity of said residue particle to vary;

d) detecting a passage of said residue particle at each of three or more locations within or near said acceleration region;

e) measuring a set of time-of-flight values for said residue particle, each said time-of-flight value being equal to a time interval between said passage of said residue particle at two of said locations;

f) determining a volume property of said residue particle by comparing said set of time-of-flight values for said particle with calibration data;

g1) determining a volume fraction of said relatively non-volatile material in said liquid by dividing said volume of said residue particle by a volume of said liquid droplet from which said relatively non-volatile material of said residue particle originated; or g2) determining a specific volume of said relatively non-volatile material in said liquid by dividing said volume of said residue particle by a mass of said liquid droplet from which said relatively non-volatile material of said residue particle originated; or g3) determining a volume of a species of a relatively non-volatile material in a limited volume of said liquid after said species has been isolated and/or concentrated in said limited volume of liquid by either a1) multiplying said volume fraction of said species in said limited volume by said limited volume, or a2) multiplying said specific volume of said species in said limited volume by a mass of said limited volume, or a3) summing said volume of each said residue particle of said species in said limited volume resulting from said droplet from said limited volume.

* * * * *